UNITED STATES PATENT OFFICE.

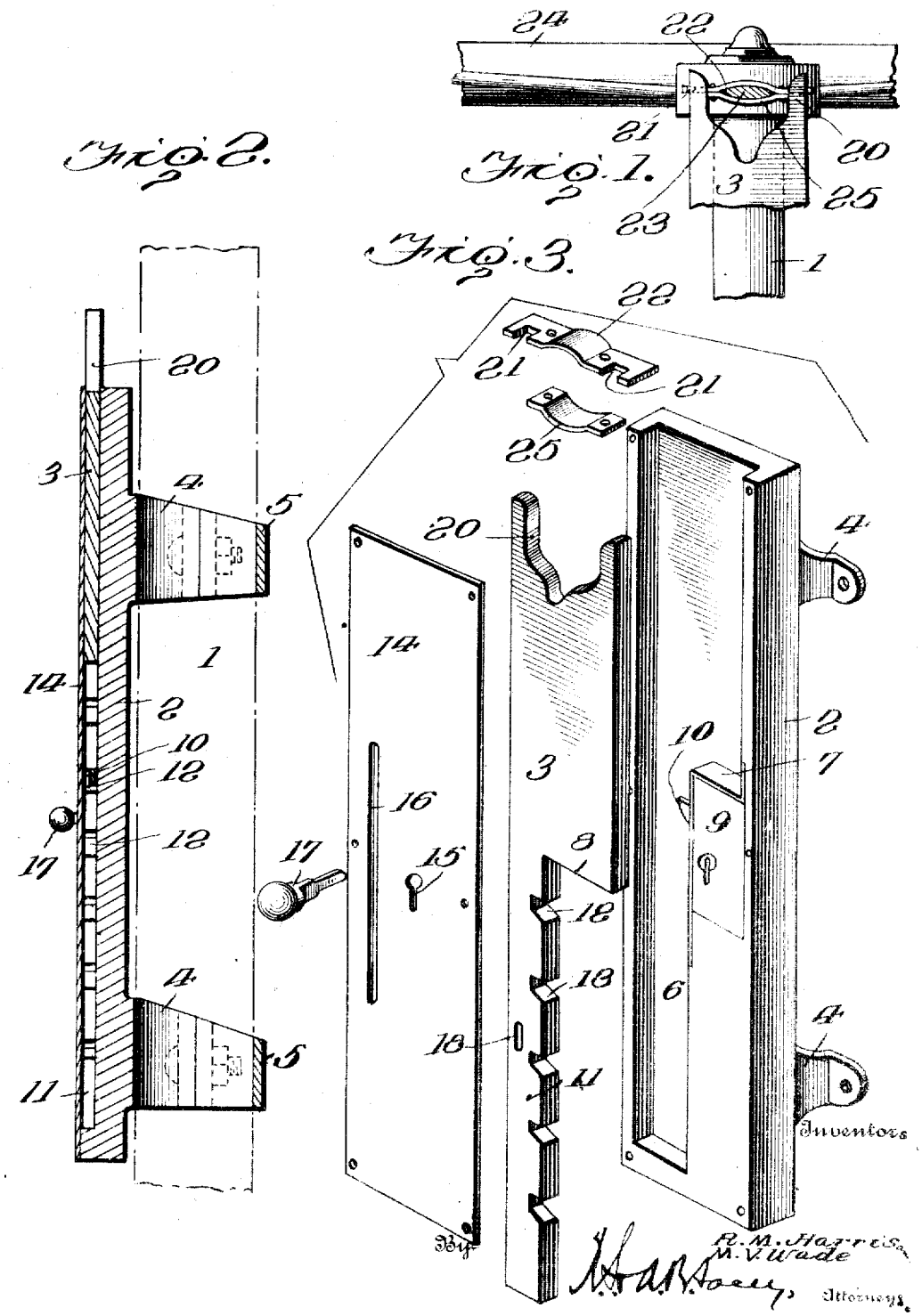

ROBERT M. HARRIS AND MILTON V. WADE, OF SAN ANTONIO, TEXAS.

LOCK FOR AUTOMOBILES.

1,201,726.  Specification of Letters Patent.  Patented Oct. 17, 1916.

Application filed November 27, 1915. Serial No. 63,843.

*To all whom it may concern:*

Be it known that we, ROBERT M. HARRIS and MILTON V. WADE, citizens of the United States, residing at San Antonio, in the county of Bexar and State of Texas, have invented certain new and useful Improvements in Locks for Automobiles, of which the following is a specification.

This invention has for its object the provision of a simple and efficient device which may be applied to the steering column of an automobile and so adjusted as to lock the steering column against movement and thereby prevent tampering with the vehicle while the owner or chauffeur is absent therefrom.

A further object of the invention is to provide a device for the stated purpose which may be readily operated and which will have its working parts inclosed so that they can be manipulated only by a person provided with a key.

The invention is illustrated in the accompanying drawings and consists in certain novel features which will be particularly pointed out in the claim following the detailed description.

In the annexed drawings: Figure 1 is a sectional elevation of a portion of an automobile steering column and wheel illustrating the application of our invention thereto; Fig. 2 is a longitudinal vertical section of our improved locking device; Fig. 3 is a detail perspective view showing the several parts separated but approximately in their relative positions.

In carrying out our invention, we secure to the steering column 1 a base plate or casing 2 within which is slidably mounted a locking arm 3. The base plate 1 is provided at one side with clips or clamping members 4 which are adapted to fit around the steering column and coacting clamping members 5 are secured rigidly to the members 4 so that the said members will together inclose the post and when fastening-bolts have been turned home will firmly secure the base plate to the column. The face of the base plate is recessed or grooved, as shown at 6, so as to accommodate the locking bar 3 and the said recess or groove is contracted or reduced in its lower portion so as to provide a shoulder 7 which serves as a stop to arrest the inward movement of the locking bar by contact with the transverse shoulder 8 formed thereon. A lock 9 having a bolt 10 is secured within the base plate at the junction of the expanded and reduced portions of the groove therein, as shown in Fig. 3, and the locking bar is constructed with a tongue 11 which fits within the reduced portion of the recess or groove. The side edges of the locking bar will engage the side walls of the recessed portion of the base plate so that the locking bar may slide readily and will be guided in its movements. The inner edge of the tongue 11 is constructed with a plurality of notches 12, the lower walls 13 of which are inclined downwardly and these notches are adapted to be engaged by the bolt 10, the inclined lower walls of the notches permitting the locking bar to be drawn upwardly past the bolt while the upper horizontal walls of the notches will contact with the upper edge of the bolt and prevent retraction of the locking bar and release of the steering wheel.

It will be readily understood that the lock may be of any preferred character and that the spring-propelled bolt 10 will yield to the inclined walls of the notches but will remain projected when engaged by the more abrupt upper walls of the notches. The locking bar is held in the recessed face of the base plate by a cover or keeper plate 14 which is secured upon the base plate by screws or similar fastenings. This cover is provided with a keyhole slot 15 to permit the insertion and withdrawal of a key for manipulating the lock 9 and is also provided with a longitudinal slot 16 through which plays a handle 17 secured in a recess or socket 18 in the locking bar. This handle may slide freely along the slot 16 so as to lift the locking bar into engagement with one of the spokes of the steering wheel 19, as will be readily understood, and it may be secured to the locking bar in any convenient or preferred manner after the cover and the locking bar are brought together and before they are assembled with the base plate. The upper end of the locking bar is forked, as shown at 20, so as to span a spoke of the steering wheel and engage notches 21 in a keeper or clip 22 which is disposed over a spoke 23 of the steering wheel 24. The keeper is arched or bowed as clearly shown, and is held in position by a coacting clip or clamping plate 25, passed under the spoke, and suitable bolts inserted through the keeper and the clamping plate.

The use and advantages of our device will be readily understood from the foregoing description taken in connection with the accompanying drawings. When the car is in use, the locking bar will be retracted so that its upper end will be free of the steering wheel. Should it be necessary for the chauffeur to leave the car unoccupied, he raises the locking bar so that the upper forked end thereof will engage the keeper 22. Inasmuch as the base plate is rigidly secured to the outer stationary member of the steering column, the engagement of the locking bar 3 with the keeper or with a spoke of the steering wheel will prevent turning of the steering wheel and, consequently, make it impossible to guide the machine so that unauthorized persons cannot use the same. When the chauffeur returns to the car, he withdraws the bolt 10, by means of a proper key, and thus permits the locking bar to retract.

Our device is exceedingly simple in the construction and arrangement of its parts and may be manufactured at a very low cost. It may be readily applied to any car and will be highly efficient for the purposes for which it is designed. The base plate may be given any suitable configuration to conform to the diameter or form of the steering column and by providing a plurality of notches in the locking bar, we are enabled to permit the said bar to be projected to a greater or less extent and thereby are enabled to accommodate the device to steering columns of different proportions.
Having thus described our invention, what is claimed as new is:

A locking device for automobiles comprising a base plate provided on one face with means for clamping it on the steering column of the automobile and having its other face provided with a longitudinal groove of angular cross section, the lower portion of said groove being reduced in width whereby an internal offset portion is provided on the base plate, a locking bar of angular cross section slidably mounted in said groove and having a longitudinal tongue at one side fitting in the reduced lower portion of the groove, the locking bar being constructed at its upper end to engage a spoke of the automobile steering wheel and intermediate its length with a shoulder adapted to abut the upper end of the offset portion of the base plate and said tongue being provided in its edge presented to the offset portion of the base plate with notches having their upper walls at right angles to said edge and their lower walls inclined downwardly, a bolt mounted in the offset portion of the base plate at the side of the lower reduced portion of the groove therein to engage a notch in the tongue of the locking bar and hold said bar projected, a keeper plate secured on the base plate over the locking bar and the bolt whereby to conceal the same and provided with a longitudinal slot, and a handle member playing in said slot and secured to the tongue of the locking bar.

In testimony whereof, we affix our signatures.

ROBERT M. HARRIS. [L. S.]
MILTON V. WADE. [L. S.]